United States Patent
Mineda (10) Patent No.: US 10,228,948 B2
(45) Date of Patent: Mar. 12, 2019

(54) PARALLELIZATION METHOD, PARALLELIZATION TOOL, AND IN-VEHICLE DEVICE

(71) Applicant: DENSO CORPORATION, Kariya, Aichi-pref. (JP)

(72) Inventor: Kenichi Mineda, Kariya (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 15/614,771

(22) Filed: Jun. 6, 2017

(65) Prior Publication Data

US 2017/0357511 A1    Dec. 14, 2017

(30) Foreign Application Priority Data

Jun. 13, 2016    (JP) .................................. 2016-117248

(51) Int. Cl.
  *G06F 9/38*    (2018.01)
  *G06F 8/41*    (2018.01)
  *G06F 9/46*    (2006.01)

(52) U.S. Cl.
  CPC ............... *G06F 9/38* (2013.01); *G06F 8/433* (2013.01); *G06F 8/456* (2013.01); *G06F 9/3838* (2013.01); *G06F 9/3851* (2013.01); *G06F 9/46* (2013.01)

(58) Field of Classification Search
  CPC ....................................................... G06F 9/38
  See application file for complete search history.

(56) References Cited

U.S. PATENT DOCUMENTS

| 2007/0260856 | A1* | 11/2007 | Tran ..................... G06F 9/3836 712/217 |
| 2014/0281402 | A1* | 9/2014 | Comparan .......... G06F 9/30189 712/214 |
| 2014/0372995 | A1 | 12/2014 | Mori et al. |
| 2016/0291950 | A1 | 10/2016 | Yatou et al. |

\* cited by examiner

*Primary Examiner* — Charlie Sun
(74) *Attorney, Agent, or Firm* — Posz Law Group, PLC (57) ABSTRACT

A computer obtains invalidation information that shows ignorable data dependency relationships from among a plurality of data dependency relationships, and extracts a synchronous-dependent relationship from among the ignorable data dependency relationships that are shown as a write-write to the same data by the invalidation information. Then, the computer generates a parallel program for maximizing the number of parallelized macro tasks by ignoring other data dependency relationships other than the extracted synchronous-dependent relationship while preventing simultaneous write to the same data by two macro tasks having the synchronous-dependent relationship.

13 Claims, 9 Drawing Sheets

PARALLELIZATION METHOD, PARALLELIZATION TOOL, AND IN-VEHICLE DEVICE

CROSS REFERENCE TO RELATED APPLICATION

The present application is based on and claims the benefit of priority of Japanese Patent Application No. 2016-117248, filed on Jun. 13, 2016, the disclosure of which is incorporated herein by reference.

TECHNICAL FIELD

The present disclosure generally relates to a parallelization method and a parallelization tool respectively for generating a parallel program for a multi-core microcomputer based on a single program for a single-core microcomputer, and an in-vehicle device to which the generated parallel program is implemented.

BACKGROUND INFORMATION

A parallelization compile method disclosed in a patent document, Japanese Patent Laid-Open No. 2015-1807 (patent document 1) for example, serves as a parallelization method to generate a parallel program for a multi-core microcomputer based on a single program for a single-core microcomputer.

In such parallelization compile method, an intermediate language is generated from a source code of the single program by performing a lexical analysis and a syntax analysis. By using such an intermediate language, a dependency analysis as well as optimization and the like among a plurality of macro tasks (i.e.; unit processes hereafter) are performed. Further, the parallelization compile method generates the parallel program based on a scheduling of the plurality of unit processes, which takes into account the dependency of each of the unit processes, and an execution time of each of the unit processes.

Now, in the course of generating a parallel program, the parallelization in a context of software is achieved based on an analysis of data dependency relationship(s), or more simply "data dependency" hereafter in the description, of each of the unit processes, while maintaining the data dependency among the plurality of unit processes. In such manner, the parallel program is enabled to maintain what has been achieved by an operation of the single-core microcomputer, i.e., by an execution of the single-core program. However, even without rigorously maintaining the data dependency, the responsiveness of the software (i.e., of the parallel program) may be maintainable. Therefore, by intentionally ignoring/unthinking the data dependency of two unit processes among which one unit process depends on the other, i.e., among two "inter-dependent" processes, a scheduling of the parallel program may be enabled to achieve a greater parallelization capacity from both of the software parallelization and the control parallelization.

Now, even though the data dependency may be ignorable/unthinkable for the scheduling and the greater capacity of the parallel program, such (i.e., ignorable) data dependency indicates that the two processes access the same data. That is, the two unit processes assigned to the two different cores of the multi-core microcomputer may simultaneously access the same data. Further, such data, under a circumstance of the simultaneous access by the two different cores, may cause data error or data abnormality. For coping with such a circumstance, an inter-core exclusion process may be added for preventing the data abnormality. However, the inter-core exclusion process has an overhead, which may greatly deteriorate the capacity of parallel processing.

In addition, a synchronization process for preventing the simultaneous execution of the inter-dependent unit processes may be used to prevent the data abnormality in, for example, the above-described circumstance. However, such a synchronization process is a scheduling restriction, and may also deteriorate the capacity of the parallel processing, because of a uniform synchronization of all inter-dependent unit processes, whenever the unit processes are found to be inter-dependent to each other.

SUMMARY

It is an object of the present disclosure to provide a parallelization method that improves a parallel execution capacity of the parallel program while reducing restrictions on the parallelization for generating a parallel program. The present disclosure also discusses a parallelization tool that implements the parallelization method, and an in-vehicle device that is enabled to optimally execute each of the unit processes in the parallel program generated therewith.

In an aspect of the present disclosure, a parallelization method generates a parallel program for a multi-core microcomputer, (i) based on a single program for a single-core microcomputer, and (ii-a) by performing a data dependency analysis for data dependency relationships among unit processes of the single program respectively accessing a same data and (ii-b) by parallelizing parallelizable unit processes of the single program.

The parallelization method includes an extraction procedure that (i) to obtains invalidation information indicative of an ignorable relationship among a plurality of the data dependency relationships, and (ii) extracts from the invalidation information a write-write data dependency relationship showing an access to the same data as a synchronous-dependent relationship. The parallelization also includes a generation procedure generating the parallel program for parallelizing a maximum number of the parallelizable unit processes, while preventing data abnormality by (a) ignoring other data dependency relationships other than the synchronous-dependent relationship, and (b) preventing simultaneous execution of the two unit processes having the synchronous-dependent relationship.

As described above, according to the present disclosure, the invalidation information is used for (I) unthinking, or ignoring, the data dependency relationships that are not extracted as the synchronous-dependent relationship, and (ii) generating the parallel program that maximizes the number of the parallelized unit processes. Therefore, in comparison to the other methods that do not ignore the data dependency relationships, the parallelization method of the present disclosure is capable of generating a parallel program with an improved capacity, i.e., at a time of parallel execution of the unit processes.

Further, when the same data is simultaneously accessed by two different cores, or more specifically, when two cores attempt to write to the same data, data abnormality may more likely be caused. Thus, according to the present disclosure, from among the data dependency relationships indicated by the invalidation information, the write-write data dependency relationship is extracted as the synchronous-dependent relationship. Then, according to the present disclosure, while preventing the simultaneous write to the same data by the two unit processes having the synchronous-dependent relationship, the number of the parallelized unit processes in the parallel program is maximized. Therefore, according to the present disclosure, the restrictions on the parallelization for generating a parallel program are reduced, in comparison to the conventional method that is configured (i) not to cause simultaneous write-write by the two unit processes and (ii) not to cause simultaneous write-read by the two unit processes.

In another aspect of the present disclosure, a parallelization tool generates a parallel program for a multi-core microcomputer, (i) based on a single program for a single-core microcomputer, and (ii-a) by performing a data dependency analysis about data dependency relationships among unit processes of the single program respectively accessing a same data, and (ii-b) by parallelizing parallelizable unit processes of the single program. The parallelization tool includes an extractor that (i) obtains invalidation information indicative of an ignorable relationship among a plurality of the data dependency relationships and (ii) extracts from the invalidation information a write-write data dependency relationship showing an access to the same data as a synchronous-dependent relationship. The parallelization tool also includes a generator that generates the parallel program for parallelizing a maximum number of the parallelizable unit processes while preventing data abnormality by (i) ignoring other data dependency relationships other than the synchronous-dependent relationship, and (ii) preventing simultaneous execution of the two unit processes having the synchronous-dependent relationship.

According to the above, the parallelization tool is, similar to the parallelization method, capable of generating a parallel program that has an improved capacity for a parallel execution time of the unit processes, while reducing the restrictions on the parallelization for generating the parallel program.

In yet another aspect of the present disclosure, a multi-core microcomputer has a plurality of cores, and a parallel program having the plurality of unit processes parallelized for the multi-core microcomputer, based on a plurality of unit processes of a single program for a single-core microcomputer.

The parallel program assigns the unit processes to the plurality of cores so that the parallelized unit processes are maximized in number based on (i) obtaining invalidation information indicative of an ignorable relationship among a plurality of the data dependency relationships, (ii) extracting from the invalidation information a write-write data dependency relationship showing an access to the same data as a synchronous-dependent relationship, and by (iii) ignoring other data dependency relationships other than the synchronous-dependent relationship, while preventing simultaneous write to the same data by the two unit processes having the synchronous-dependent relationship. Each of the plurality of cores of the multi-core microcomputer executes the unit processes assigned to the each of the plurality of cores of the multi-core microprocessor.

According to the above, the in-vehicle device includes the parallel program that has a greater number of the unit processes that are parallelized for the efficient processing. Therefore, the execution of each of the unit processes is optimized.

The numerals used herein show an exemplary relationship between the claim elements and the components/configurations in the embodiments. Therefore, such an exemplary relationship does not limit the scope of the present disclosure in any manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments for carrying out the present disclosure are described with reference to the drawings in the following.

According to the present embodiment, a computer 10 is used for generating a parallel program 21a1 for a multi-core processor 21 having a first core 21c and a second core 21d, in which a plurality of unit processes of a single program for a single-core microcomputer that has only one core are parallelized. Further, an automatic parallelization compiler 1 for generating the parallel program 21a1 is used in the present embodiment. Further, in the present embodiment, an in-vehicle device 20 provided with the parallel program 21a1 that is generated by the computer 10 is used. As used herein, the term "processor" may refer to a "microcomputer," such that the term "multi-core microcomputer" may be used in place of the term "multi-core processor."

The automatic parallelization compiler 1 includes a procedure for generating the parallel program 21a1. Therefore; the automatic parallelization compiler 1 may also be referred to herein as a parallelization method.

The automatic parallelization compiler 1 is a program including the parallelization method. Further, the computer 10 generates, by executing the automatic parallelization compiler 1, the parallel program 21a1. Therefore, the computer 10 may also be referred to herein a parallelization tool.

The above-mentioned unit process can be reworded as a process block, a Macro Task (MT), or the like. In the following, the unit process may also be designated as MT.

According to the present embodiment, an 11th MT to a 13th MT are adopted as a first example, and a 21st MT to a 23rd MT are adopted as a second example.

Note that each of those MTs includes at least one instruction that is executable by either of the first core 21c or the second core 21d.

A background for generating the parallel program 21a1 is that the multi-core processor 21 is used as a processor for solving heat problems, power consumption problems, clock frequency problems and the like. In addition, the multi-core processor 21 is used for in-vehicle devices. Furthermore, as for the parallel program 21a1; a high-reliability and high-performance program/software is used, which also is developed quickly at a low cost.

Note that, when generating the parallel program 21a1, the data dependency relationship of a plurality of MTs in the single program is analyzed, and each of the plurality of MTs is assigned, i.e. "allocated," to the respective cores 21c and 21d of the multi-core processor 21. Regarding the assignment of the unit processes to the multiple cores, please refer to a publication of Japanese patent application, JP 2015-1807 A.

In the present embodiment, a single program written in C language is used as an example. However, the present disclosure is not limited to such configuration. The single program may also be written in other programming languages other than C language.

Figure 7:
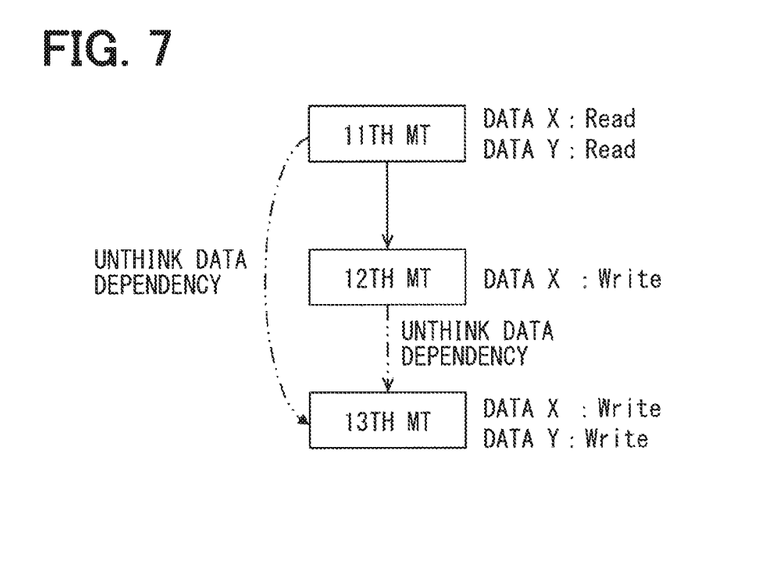
FIG. 7 is an illustration of an example of a single program.
Figure 10:
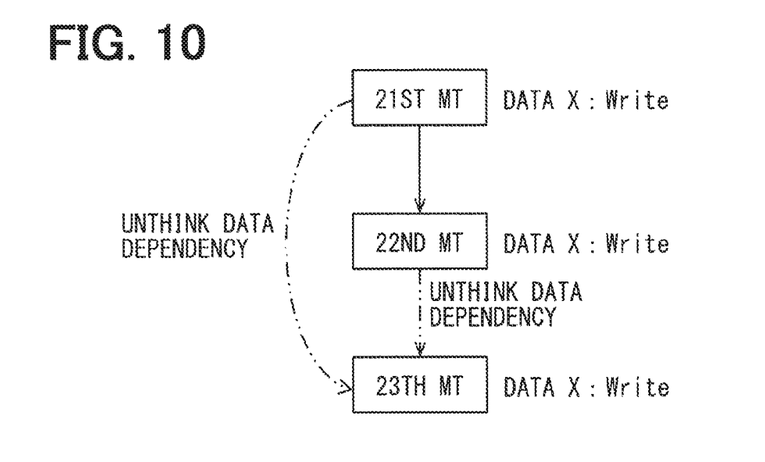
FIG. 10 is an illustration of another example of the single program.

In the present embodiment, a single program containing the 11th MT—the 13th MT shown in FIG. 7, and a single program containing the 21st MT—the 23rd MT shown in FIG. 10 are used. The plurality of MTs shown in FIGS. 7 and 10 include "inter-dependent" MTs, among which a certain data dependency relationship (i.e., simplified to "DATA DEPENDENCY" in FIGS. 7 and 10) is established, via an access to the same data, for example.

In FIG. 7 and FIG. 10, arrow-connected MTs have a data dependency relationship (i.e., are inter-dependent MTs). In particular, a two-dot chain line arrow shows a data dependency relationship, which is invalidated (i.e., ignored/disregarded/nullified/made invalid) based on invalidation information 30 (i.e., information that may be ignored, invisible, hidden, invalid, disregarded, or nullified).

Further, the plurality of unit processes in a single program are configured as divisible into plural function groups. For example, certain plural MTs intended for achieving a function α are grouped as a function group a, and certain other plural MTs for achieving β function are grouped as a function group β.

Figure 6:
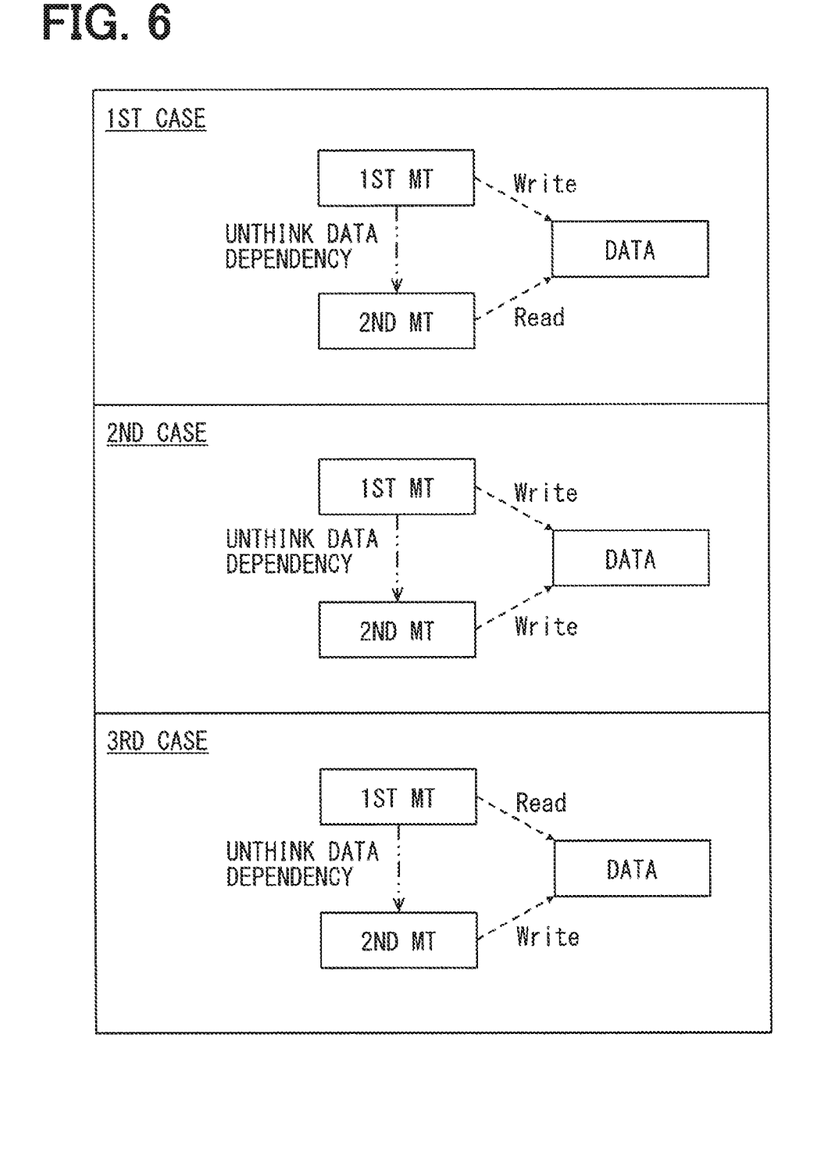
FIG. 6 is an illustration of data dependency of a unit process.

The data dependence relationship is a relationship of two MTs at the time of respectively accessing the same data. The data dependency relationship may be classified into the first to third cases, as shown in FIG. 6.

The first case is a relationship in which the first MT writes to certain data (Write) and the second MT refers to, or reads, that certain data (Read).

The second case is a relationship in which the first MT and the second MT write to the same data (Write).

The third case is a relationship in which the first MT refers to, or reads, certain data (Read), and the second MT writes to that certain data (Write).

Note that, in the single program, an execution sequence (i.e., a processing order) is defined in such manner that the first MT is executed prior to an execution of the second MT.

Note that the first case mentioned above may also be designated as a Write-Read (WR) relationship, since it is a Write-Read data dependency relationship in which Write and Read happen in sequence, and the second case mentioned above may also be designated as a Write-Write (WW) relationship, since it is a Write-Write data dependency relationship in which Write and Write happen in sequence.

Further, since Read and Write happen in sequence, the third case is a data dependency relationship of Read-Write (RW), and may also be designated as a RW relationship.

Note, in general, that, due to the independence among the different functions and different function groups built into a program at the design stage, an execution sequence of those functions/function groups (i.e., an accessing order to the same/relevant data) has substantially no or very little difference, in terms of an influence to the responsiveness of control of the in-vehicle device 20.

That is, two MTs grouped into different function groups may be executable according to a scheduling that ignores/invalidates the data dependency relationship among the two MTs in many cases.

Thus, the parallel program generated in such, a dependency-invalidated manner has sufficiently small influence on the control of the in-vehicle device 20, i.e., the parallel program is enabled to maintain the responsiveness of the control.

Further, in the present embodiment, it is assumed that the influence of the execution sequence among the functions/function groups on the responsiveness of the control of the in-vehicle device 20 is sufficiently small. Therefore, the data dependency relationship among two MTs that are grouped into two different function groups may be defined as ignorable, i.e., capable of being invalidated. That is, the parallel program 21a1 is generated by using the invalidation information 30, which shows ignorable/invalidatable data dependency relationship(s) from among a plurality of relevant data dependency relationships.

Note that, in the first example, the 11th MT and the 12th MT belong to the same function group, and the 13th MT belongs to a different function group that is different from the one to which the 11th MT and the 12th MT belong.

On the other hand, in the second example, the 21st MT and the 22nd MT belong to the same function group, and the 23rd MT belongs to a different function group that is different from the one to which the 21st MT and the 22nd MT belong.

Further, in the first example, the 11th MT and the 12th MT are assigned to the same core, and the 13th MT is assigned to a different core that is different from the one to which the 11th MT and the 12th MT are assigned.

On the other hand, in the second example, the 21st MT and the 22nd MT are assigned to the same core, and the 23rd MT is assigned to a different core that is different from the one to which the 21st MT and the 22nd MT are assigned.

Further, in the present embodiment, the parallel program generated by ignoring/invalidating the data dependency relationship among different function groups is assumed as having sufficiently small influence on the control of the in-vehicle device 20.

In considering a case in which two inter-dependent MTs of the parallel program 21a1 are assigned to respectively different cores 21c and 21d, the parallel program 21a1 includes a synchronization process that synchronizes execution of two MTs, i.e., until the completion of execution of a prior processing order MT, the execution of a posterior processing order MT is put on hold.

That is, in other words, a synchronization process of the parallel program 21a1 synchronizes a first MT and a third MT assigned to a self-core and second MT assigned to an other-core, by putting an execution of the third MT assigned to the self-core on hold until completion of the execution of the other MT assigned to the other-core, when execution of the first MT assigned to the self-core is complete.

Therefore, the first core 21c and the second core 21d, described in further detail below, respectively access, in order to perform the synchronization process, a Random-Access Memory (RAM) 21b, and memorize (i.e., store) information while waiting for synchronization (i.e., referred to herein as completion information) in the RAM 21b, when execution of MTs assigned to those cores 21c and 21d are complete.

Then, the self-core, which waits for completion of execution of the MT with the data dependency relationship by the other-core, periodically accesses the RAM 21b and confirms whether the RAM 21b memorizes the completion information, without performing the MT assigned to the self-core. In other words, the self-core waits for the other-core to execute the MT with the data dependency relationship before executing the MT assigned to the self-core, and the self-core periodically accesses the RAM 21b to confirm whether the completion information is memorized/stored to the RAM 21b.

Thus, the first core 21c and the second core 21d executes respective MTs by waiting for each other, i.e., in synchronization. That is, the synchronization process can also be designated as a waiting process.

Note that the parallel program 21a1 includes a program which is executed by the first core 21c and a program which is executed by the second core 21d.

Figure 1:
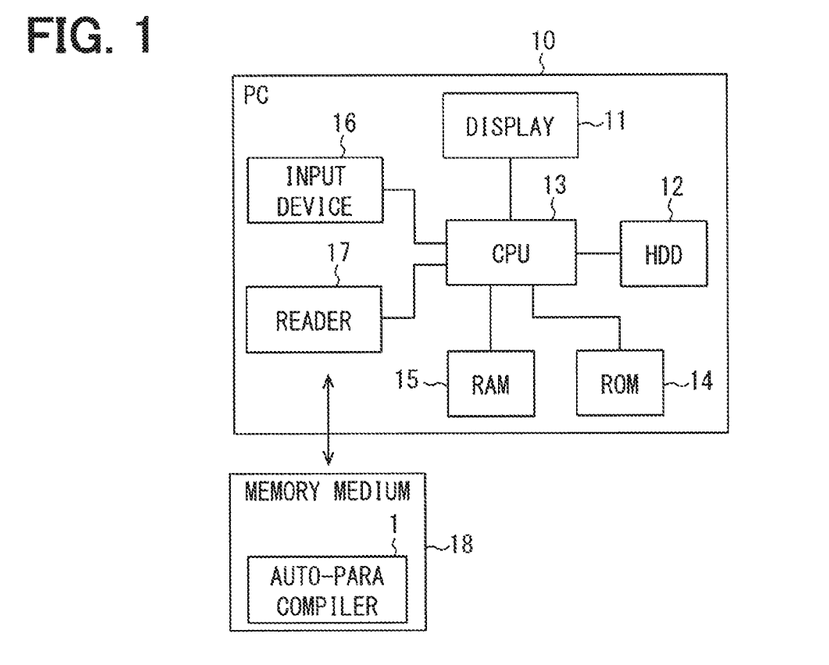
FIG. 1 is a block diagram of a computer in one embodiment of the present disclosure.

Here, the configuration of the computer 10 is described with reference to FIG. 1 and FIG. 3.

The computer 10 is provided with a display 11, a Hard Disk Drive (HDD) 12, a Central Processing Unit (CPU) 13, a Read-Only Memory (ROM) 14, a RAM 15, an input device 16, a reader 17, and the like. The computer 10 is capable of reading the memory content memorized by a memory medium 18. The automatic parallelization compiler 1 is memorized by the memory medium 18. Therefore, the computer 10 generates the parallel program 21a1 by executing the automatic parallelization compiler 1 memorized by the memory medium 18.

With regard to the configuration of the computer 10 and the memory medium 18, please refer to a personal computer 100 and a memory medium 180 disclosed in a publication of a patent application JP 2015-1807 A. Note that the automatic parallelization compiler 1 includes, in addition to what is disclosed by JP 2015-1807 A, an extraction procedure, a calculation procedure, and a determination procedure.

Figure 3:
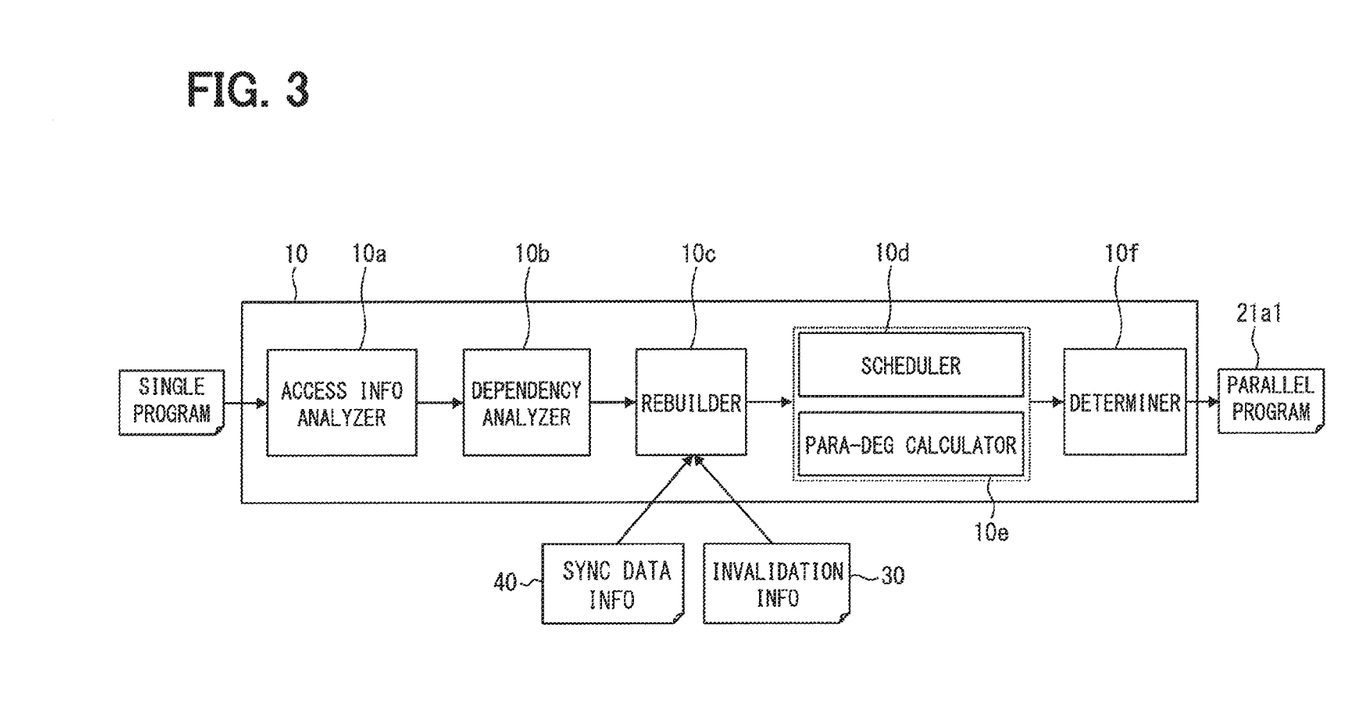
FIG. 3 is a block diagram of functions of the computer in one embodiment of the present disclosure.

Further, the computer 10 is provided with an access information analyzer 10a, a dependency analyzer 1013, a rebuilder 10c, a scheduler 10d, a parallel degree calculator 10e, and a determiner 10f respectively as function blocks, as shown in FIG. 3.

The access information analyzer 10a analyzes data access information of each MT in the single program. That is, the access information analyzer 10a analyzes the Read and Write functions to and from the data by each MT. As shown in FIG. 7, the data access of the 11th MT is Read to (i.e., Read access to) data X and data Y, the data access of the 12th MT is Write to data X, and the data access of the 13th MT is Write to data X and to data Y. Further, as shown in FIG. 10, the data access of the 21st MT, the 22nd MT, and the 23rd MT is Write to data X.

The dependency relationship analyzer 10b analyzes the data dependency relationship of the single program, and extracts MTs which can be parallelized.

The rebuilder 10c rebuilds the data dependency relationship in consideration of the invalidation information 30. Further, the rebuilder 10c generates a plurality of data dependency patterns based on the rebuilt data dependency relationship.

Now, among the data dependency relationships shown by the invalidation information 30, the WW relationship may possibly cause data interference and may cause data breakage, due to simultaneous execution. The data may be destroyed by such operation. That is, among the first to third cases shown in FIG. 6, the second case may suffer from a scheduling that executes two MTs simultaneously by ignoring the data dependency relationship between two MTs, and, as a result, data interference may take place in such case.

Therefore, the synchronization process needs to be performed for synchronizing operations between two WW relationship MTs. That is, data interference is preventable if two MTs writing to the same data are prevented from being simultaneously executed, by performing the synchronization process.

Thus, the rebuilder 10c extracts a WW relationship to the same data as a synchronous-dependent relationship from among the data dependency relationships shown by the invalidation information 30. Note that the rebuilder 10c is enabled to extract the synchronous-dependent relationship from an analysis result of the access information analyzer 10a, or the like.

Further, the rebuilder 10c ignores an RW relationship and a WR relationship among the data dependency relationship shown by the invalidation information 30.

On the other hand, the rebuilder 10c generates a data dependency pattern regarding a WW relationship shown by the invalidation information 30, in which an execution sequence of the MTs having the WW relationship is switched, i.e., flipped or reversed.

Further, some of the RW relationships and WR relationships shown by the invalidation information 30 may, in terms of control, run simultaneously, i.e., some of those relationships may use scheduling or the matching of data update timing. If those relationships are invalidated, that may lead to the unmatching of the data update timing, and may deteriorate data consistency.

Thus, the rebuilder 10c obtains synchronous data information 40, which shows a group of data that may abide by or follow a control restriction—that is, a control that may, for example, control an execution order or execution time of the RW relationship or the WR relationship. In the synchronous data information 40, a group of data that may follow a control restriction for the timing of the RW/WR relationship is, for example, specified in a list form, or written in a form of a specifier of the program code, or the like.

For example, a control restriction for the timing of data read/write may be used in engine control where injection amount data and injection angle data are synchronized to one another. An interruption, for example, caused by an arrangement/order of software code execution, may update injection amount data but not injection angle data, resulting in data unsynchronization. Accordingly, data should refresh/update at similar rates to synchronize data for appropriate engine control.

Further, the rebuilder 10c may further extract, from among the data dependency relationships shown by the invalidation information 30, the data dependency relationship containing Write and Read to the data that is shown by the synchronous data information 40 as a synchronous-dependent relationship as the data dependency relationship containing Write and Read is the RW relationship and the WR relationship.

The rebuilder 10c generates the data dependency pattern in which an execution sequence of RW relationship MTs is flipped/reversed, for the RW relationship(s) of the data shown by the synchronous data information 40, which is/are extracted from among the RW data dependency relationships shown by the invalidation information 30.

Similarly, the rebuilder 10c generates the data dependency pattern in which an execution sequence of WR relationship MTs is flipped/reversed, for the WR relationship(s) of the data shown by the synchronous data information 40, which is/are extracted from among the WR data dependency relationships shown by the invalidation information 30.

Note that the present disclosure needs not have to extract the data dependency relationships shown by the synchronous data information 40. For example, the present disclosure would also work by extracting the WW relationship as a synchronous-dependent relationship.

As described above, the rebuilder 10c is a component for extracting the synchronous-dependent relationship, thereby serving as an extractor. Note that the computer 10 extracts a relationship by executing the automatic parallelization compiler 1. Therefore, the rebuilder 10c may also be referred to herein as an extraction procedure.

Figure 11:
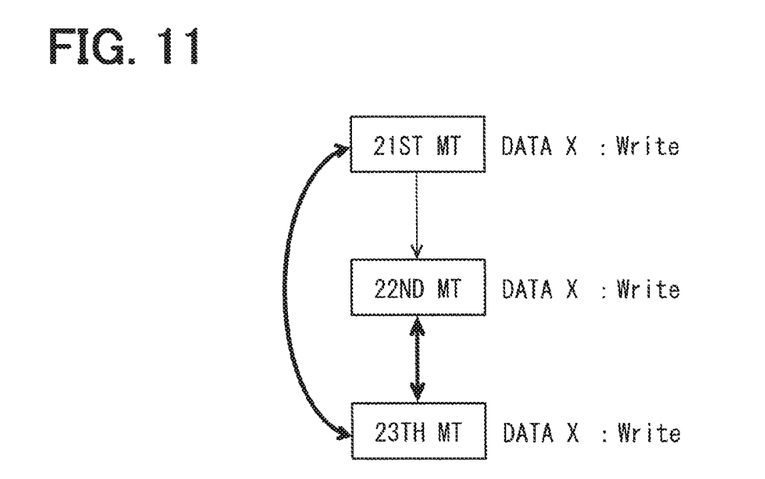
FIG. 11 is an illustration of an application of the must-sync dependency to the single program in FIG. 10.

Here, generation of the data dependency pattern for the 21st MT—the 23rd MT regarding the second example is described with reference to FIG. 10, FIG. 11, and FIG. 12. Note that a both-directions arrow of the thick line in FIG. 11 is where the synchronization process is added.

As shown in FIG. 10, in the second example, the data dependency relationship of the 21st MT and the 23rd MT, and the data dependency relationship of the 22nd MT and the 23rd MT are ignorable according to the invalidation information 30. However, both of the 21st MT and the 23rd MT are a WW relationship. Similarly, the relationship of the 22nd MT and the 23rd MT is a WW relationship. That is, as shown in FIG. 11, since the relationship of the 21st MT and the 23rd MT and the relationship of the 22nd MT and the 23rd MT are an "inter-core" WW relationship, which involves two different cores, the processing order can be determined according to the scheduling result, and the synchronization process can be added, to prevent a simultaneous write to the same data.

Figure 12:
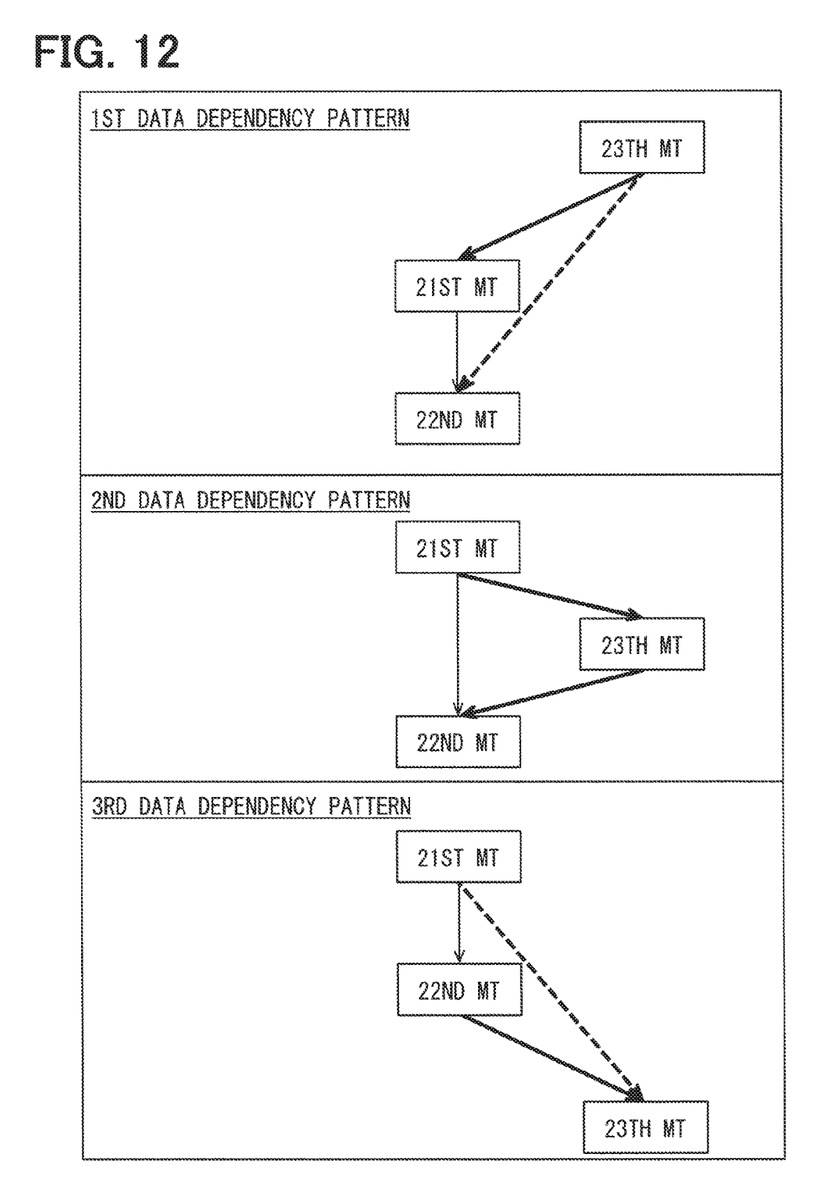
FIG. 12 is an illustration of a data dependency pattern of the single program in FIG. 11.

Therefore, the computer 10 generates the data dependency pattern, as illustrated in FIG. 12.

The first data dependency pattern is a pattern in which the processing order of the 21st MT and the 23rd MT is flipped, or reversed, from the one in the single program.

The second data dependency pattern is a pattern in which the processing order of the 22nd MT and the 23rd MT is flipped from the one in the single program.

The third data dependency pattern is a pattern in which the processing order of the 21st MT and the 23rd MT is maintained, i.e., is kept unchanged, from the one in the single program.

Note that, in the first data dependency pattern, the data dependency relationship of the 23rd MT and the 22nd MT shown by a dashed line arrow does not have a real effect.

Similarly, in the third data dependency pattern, the data dependency relationship of the 21st MT and the 23rd MT shown by a dashed line arrow does not have a real effect.

Therefore, for those relationships, the synchronization process at the time of parallel execution is unnecessary.

As described above, the computer 10 exhaustively generates, for all of the extracted synchronous-dependent relationships, data dependency patterns by either maintaining or reversing a processing order of the two unit processes relative to the processing order of the two unit processes in the single program. The "exhaustively generating" the data dependency patterns means that all combinations of the MTs involved are exhausted in terms of the processing orders among them.

Such an exhaustive generation of all combination patterns is for maximizing the capacity improvement achieved by ignoring/unthinking the data dependency relationship, when the proposed technique of the present disclosure for eliminating an inter-core exclusion process is performed.

For each of a plurality of the data dependency patterns generated by the rebuilder 1nc, the scheduler 10d and the parallel degree calculator 10e calculate a degree of parallelization of the generated data dependency patterns while performing scheduling.

That is, for each of the plurality of data dependency patterns generated in the above-described manner, the scheduler 10d and the parallel degree calculator 10e make a "schedule" individually, and then calculate the degree of parallelization of the individual schedule.

Note that the scheduler 10d and the parallel degree calculator 10e may serve as a calculator. Further, the computer 10 performs scheduling and calculation of the degree of parallelization by executing the automatic parallelization compiler 1. Therefore, the scheduler 10d and the parallel degree calculator 10e may also serve as a calculation procedure.

The determiner 10f picks up, i.e., or adopts, the maximum degree of parallelization. That is, by determining an adoption of the scheduling result that yields a maximum degree of parallelization, the determiner 10f generates a parallel program that parallelizes a maximum number of MTs.

That is, by performing scheduling for all of the data dependency patterns and by calculating and comparing the degrees of parallelization of those patterns, the computer 10 is enabled to generate a parallel program at maximum capacity with the maximum number of MTs.

Note that, the degree of parallelization is a degree of improvement of the worst execution time of the parallel program relative to the pre-parallelization execution time of the single program. That is, the greater the increase in number of parallelized MTs, the greater the degree of parallelization.

As mentioned above, the computer 10 adopts a scheduling result which maximizes the degree of parallelization, by executing the automatic parallelization compiler 1. Therefore, the determiner 10f may serve as a determination procedure.

Further, the computer 10 may generate a parallel program, without generating the data dependency pattern(s).

In such case, the rebuilder 10c rebuilds the data dependency relationship, which considers the invalidation information 30. That is, from among the data dependency relationships shown by the invalidation information 30, the rebuilder 10c extracts a WW relationship to the same data as the synchronous-dependent relationship.

The rebuilder 10c may further extract, from among the data dependency relationships shown by the invalidation information 30, a data dependency relationship containing Write and Read to the same data that is shown by the synchronous data information 40 as the synchronous-dependent relationship.

The scheduler 10d either maintains or reverses the processing order of the two MTs extracted as the synchronous-dependent relationship by the rebuilder 10c, and generates a plurality of schedule patterns.

The parallel degree calculator 10e calculates the degree of parallelization of each of the schedule patterns from the scheduling result. Further, from among the plurality of schedule patterns, the determiner 10f determines to adopt a schedule pattern in which the degree of parallelization is maximized, for generating a parallel program that maximizes a total processing time of the parallelized MTs. In the course of such determination, the determiner 10l chooses a schedule pattern that prevents a simultaneous write to the same data by the two MTs having the synchronous-dependent relationship. Further, when using the synchronous data information 40, the determiner 10f chooses a schedule pattern so that a timing control restriction is maintained.

In the following, with reference to FIG. 7, FIG. 8, and FIG. 9, generation of the schedule patterns for the 11th MT—the 13th MT regarding the first example is described.

Figure 8:
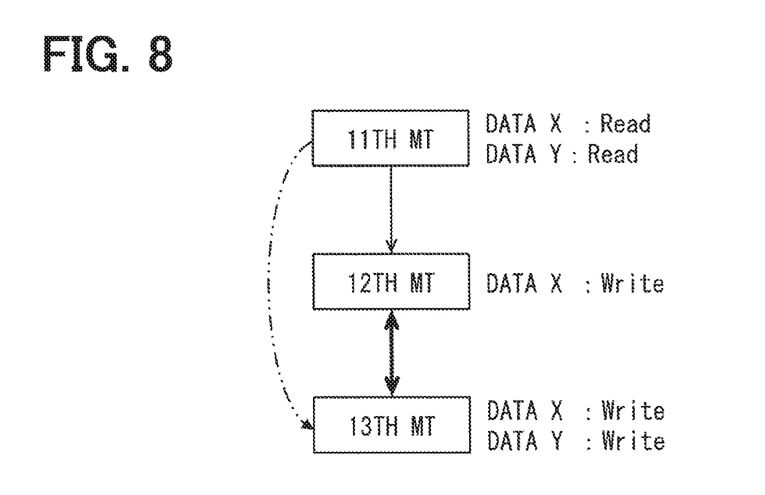
FIG. 8 is an illustration of an application of a must-sync dependency to the single program in FIG. 7.

Note that a both-directions arrow of the thick line in FIG. 8 is where the synchronization process is added.

As shown in FIG. 7, according to the invalidation information 30, the first example is an example in which the data dependency relationship of the 11th MT and the 13th MT and the data dependency relationship of the 12th MT and the 13th MT are both ignorable/unthinkable. However, the 12th MT and the 13th MT have a WW relationship. That is, since the 12th MT and the 13th MT are associated with an inter-core WW relationship involving two different cores, as shown in FIG. 8, the processing order of the 12th and 13th MTs is determined according to the scheduling result, the 12th and 13th MTs is controlled not to perform a writing simultaneously to the same data by adding the synchronization process.

Figure 9:
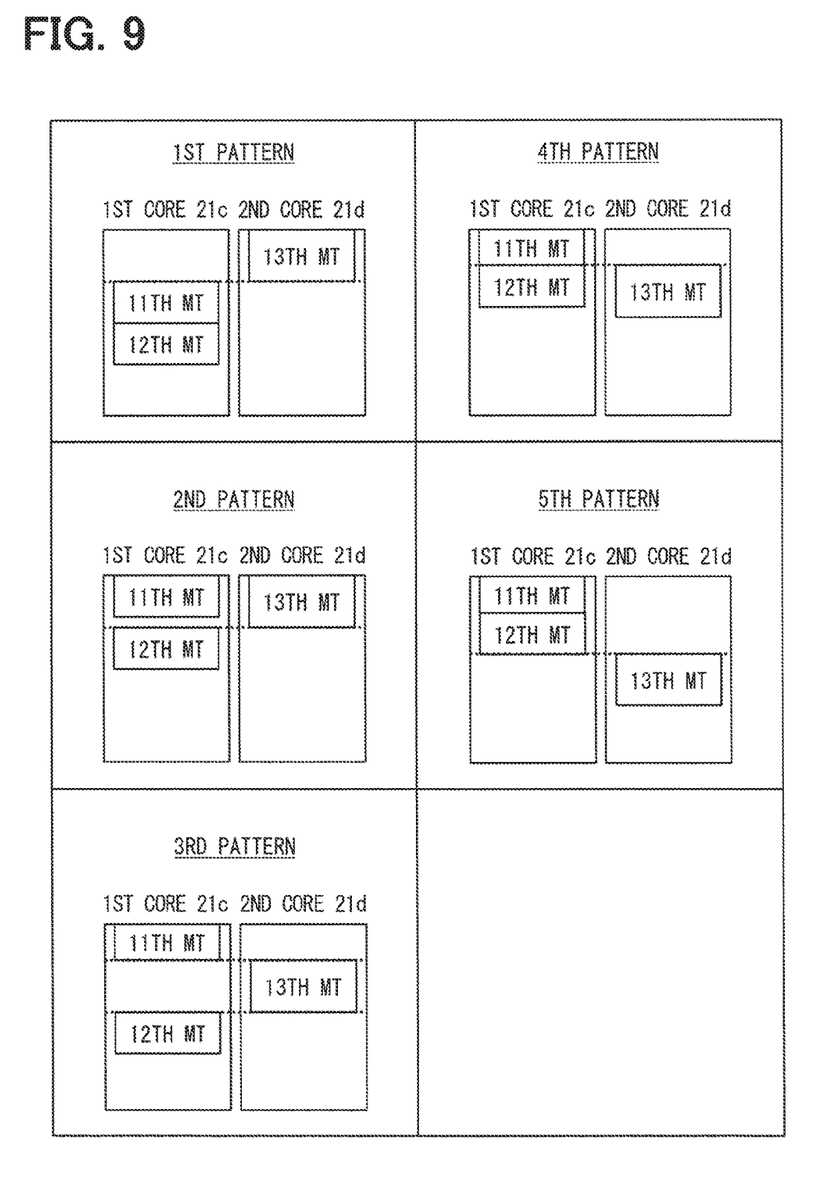
FIG. 9 is an illustration of a schedule pattern of the single program in FIG. 8.

Then, the computer 10 generates a plurality of schedule patterns, as shown in FIG. 9. That is, the schedule patterns are generated as five patterns, i.e., the first pattern, the second pattern, the third pattern, the fourth pattern, and the fifth pattern are generated.

Note that the fourth pattern has a simultaneous write to the data by the 12th MT and the 13th MT, as illustrated in FIG. 9. Therefore, the determiner 10f does not choose the fourth pattern. That is, the computer 10 performs scheduling by excluding the fourth pattern.

Further, the scheduler 10d, the parallel degree calculator 10e, and the determiner 10f serve as a generator. Also, since the computer 10 generates a parallel program by executing the automatic parallelization compiler 1, the scheduler 10d, the parallel degree calculator 10e, and the determiner 10f also serve as a generation procedure.

Here, the processing operation of the computer 10 is described with reference to flowcharts shown in FIG. 4 and FIG. 5.

Figure 4:
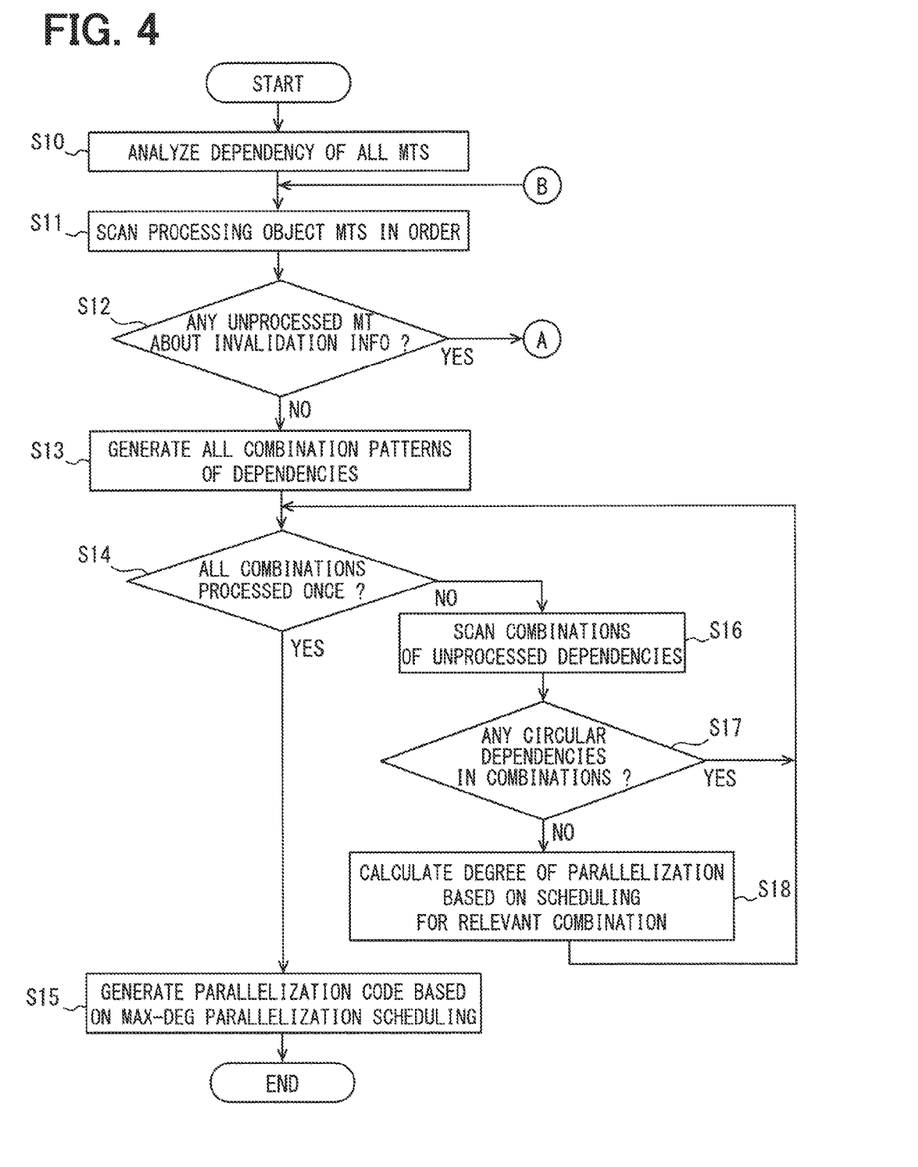
FIG. 4 is a flowchart of a process of the computer in one embodiment of the present disclosure.
Figure 5:
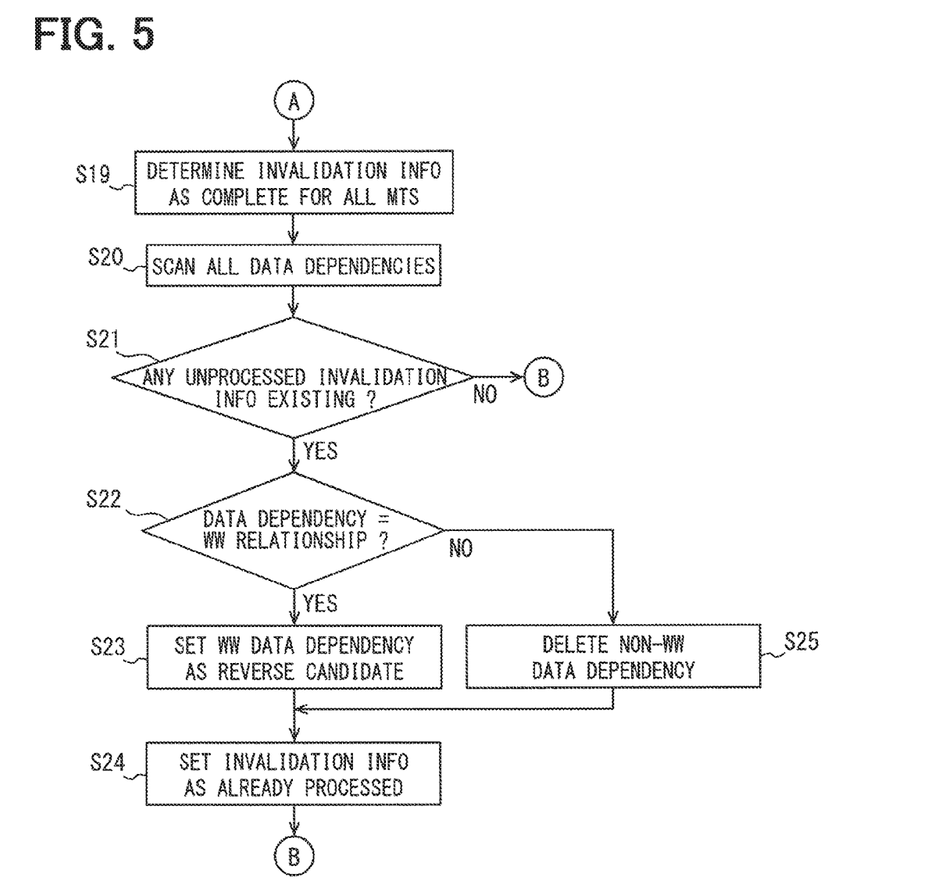
FIG. 5 is a flowchart of a process of the computer in one embodiment of the present disclosure.

FIG. 4 and FIG. 5 show a series of processing operations of the computer 10. The computer 10 starts with a process shown in FIG. 4, when an operation is started.

When the computer 10 performs a YES determination in Step S12 of FIG. 4, the process proceeds to Step S19 (i.e., a circled A) in FIG. 5.

Further, the computer 10 proceeds to Step S11 (i.e., a circled B) in FIG. 4, when a NO determination is performed in Step S21 of FIG. 5 and when the process of Step S24 is complete.

In Step S10, the data dependency relationships of all MTs are analyzed. In other words, an analysis is performed in terms of determining which one of a WW relationship, a WR relationship, and a RW relationship, a subject data dependency relationship is.

Note that "data dependency relationship" is simplified to "DEPENDENCY" in FIG. 4 and in other drawings.

In Steps S11 and S12, it is determined whether there is any unprocessed MT about the invalidation information 30, by orderly scanning processing object MTs, i.e., examining MTs one by one.

That is, it is determined whether, from among the all data dependency relationships analyzed in Step S10, there is any MT about which a determination process of whether the invalidation information 30 applies or not has NOT yet been performed.

When it is determined that there is an unprocessed MT, the process proceeds to Step S19. On the other hand, when it is determined that there is no unprocessed MT, the process proceeds to Step S13.

In Step S19, it is determined that the invalidation information 30 is completely processed in terms of being applicable/corresponding, or not, to the MTs that are picked up in Step S12. That is, in Step S19, it is determined that a determination process regarding whether or not the invalidation information 30 applies about all S12-picked-up processing object MTs is complete.

In Step S20, all data dependency relationships are scanned. That is, the data dependency relationships about all processing object MTs (i.e., picked up in Step S12) are scanned.

In Step S21, it is determined whether the invalidation information 30 that is not yet processed exists. That is, it is determined whether any unprocessed invalidation information 30 exists for each of the processing object MTs, and, when it is determined as existing, the process proceeds to Step S22. On the other hand, when it is determined as not existing, the process returns to Step S11.

In Step S22, it is determined whether a data dependency relationship is a WW relationship. That is, it is determined whether the data dependency relationship to which the invalidation information 30 applies is a WW relationship, in other words whether the data dependency relationship is a synchronous-dependent relationship.

When it is determined that the relationship is a WW relationship, it is considered that the relationship is a synchronous-dependent relationship, and the process proceeds to Step S23.

On the other hand, when it is determined that the relationship is not a WW relationship, it is considered that the relationship is not a synchronous-dependent relationship, and the process proceeds to Step S25.

In Step S23, the subject data dependency relationship is set as a reverse candidate. That is, the relationship (i) to which the invalidation information 30 applies and (ii) which is determined as a WW relationship is set as a reverse candidate.

On the other hand, in Step S25, the subject data dependency relationship is deleted. That is, the relationship to which the invalidation information 30 applies is deleted.

In Step S24, the relevant invalidation information 30 is set as already processed. Further, after the process in Step S24 is complete, the process returns to Step S11.

In Step S13, all combination patterns of the data dependency relationships are generated. That is, the data dependency pattern is generated as to all combinations of MTs as mentioned above. Therefore, the data dependency pattern(s) may also be designated as combination(s) hereafter.

The computer 10 performs the process shown in the following Steps S14-S18 by using a plurality of data dependency patterns generated in the above-described manner, and generates the parallel program 21a1.

In Step S14, it is determined whether all combinations are processed once (i.e., whether Steps S16-S18 are performed once for all combination patterns). That is, it is determined whether, for each of all the combination patterns, a scheduling and a calculation of the degree of parallelization are performed.

When it is determined that all combinations have been processed, the process proceeds to Step S15. On the other hand, when it is determined that all combinations have not yet been processed, the process proceeds to Step S16.

In Step S15, the parallelization code is generated by using a scheduling that has yielded the maximum degree of parallelization. That is, the parallel program 21a1 is generated based on a maximum-degree parallelization scheduling.

In Steps S16 and S17, it is determined whether there are any circular dependencies among the data dependency relationships of the processing object MTs by scanning combinations of the unprocessed data dependency relationships.

In other words, it is determined whether there is any data dependency relationship that causes contradiction/inconsistency when the data dependency in the relationship is flipped/reversed.

When it is determined that there is no circular dependencies, it is considered/interpreted that no contradiction is caused, and the process proceeds to Step S18.

On the other hand, when it is determined that there are circular dependencies, it is considered/interpreted that a contradiction may be caused, and the process returns to Step S14.

In Step S18, a scheduling is performed for the combination of no-contradiction relationships (i.e., RELEVANT COMBINATION in S18 of FIG. 4), and the degree of parallelization is calculated for such combination.

Therefore, as described above, the computer 10 ignores/unthinks the data dependency relationship, which is not extracted as the synchronous-dependent relationship from among the data dependency relationships shown by the invalidation information 30.

Then, while preventing the simultaneous write to the same data by the two MTs that have the synchronous-dependent relationship among the data dependency relationships shown by the invalidation information 30, the computer 10 generates the parallel program 21a1 so that the parallelization of the maximum number of MTs is achieved.

Further, when obtaining the synchronous data information 40, the computer 10 ignores/unthinks the data dependency relationship which is not extracted as the synchronous-dependent relationship from among the data dependency relationship shown by the invalidation information 30.

Then, the computer 10 generates the parallel program 21a1 that maximizes the number of parallelized MTs, (i) by preventing the simultaneous write to the same data by the two MTs having the synchronous-dependent relationship among the data dependency relationships shown by the invalidation information 30 and (ii) by abiding by the timing control restriction.

Therefore, the computer 10 is enabled to generate the parallel program 21a1 that parallelizes the maximum number of unit processes by ignoring/unthinking the data dependency relationship that is not extracted as the synchronous-dependent relationship from among the data dependency relationship shown by the invalidation information 30.

Thus, the computer 10 is capable of generating the parallel program 21a1 that can improve the capacity at the time of parallel execution than the one generated by not ignoring any data dependency relationship.

Further, when the data is simultaneously accessed by two different cores 21c and 21d, i.e., especially when the two different cores 21c and 21d simultaneously write to the same data, a data abnormality may be caused.

Therefore, the computer 10 extracts a WW relationship to the same data as the synchronous-dependent relationship from the data dependency relationships shown by the invalidation information 30. Then, the computer 10 generates the parallel program 21a1 that parallelizes the maximum number of MTs while preventing the simultaneous write to the same data by the two MTs having the synchronous-dependent relationship.

Therefore, the computer 10 is enabled to reduce the restriction for generating the parallel program 21a1, when compared with the conventional restriction for (i) preventing the simultaneous write to the same data by the two MTs and (ii) preventing a simultaneous occurrence of the writing by one MT and the reading by the other MT.

That is, in other words, from among the data dependency relationships shown by the invalidation information 30, the computer 10 can ignore/unthink the WR relationship and the RW relationship to the same data, thereby reducing the restriction on the generation of the parallel program 21a1.

Further, when performing a parallel execution of the plurality of MTs by ignoring/unthinking the data dependency relationship on the multiple cores, the computer 10 can extract possibly-interfering MTs that may cause data interference with each other. Therefore, according to the present disclosure, the computer 10 does not only provide an automatic generation process of a parallelization code, but also provides an interference prevention measure/process.

Furthermore, by using the synchronous data information 40, the computer 10 can extract the synchronous-dependent relationship in consideration of the control restriction besides considering the WW relationship. Such a control restriction may serve as a necessitating factor for executing an inter-core exclusion process that is not analyzable by using software.

However, the computer 10 is enabled to cope with such a situation by using the synchronous data information 40, i.e., without executing the inter-core exclusion process.

Note that the computer 10 generates the parallel program by executing the automatic parallelization compiler 1. Therefore, the automatic parallelization compiler 1 can achieve the same effects as the computer 10.

Next, the configuration of the in-vehicle device 20 is described.

Figure 2:
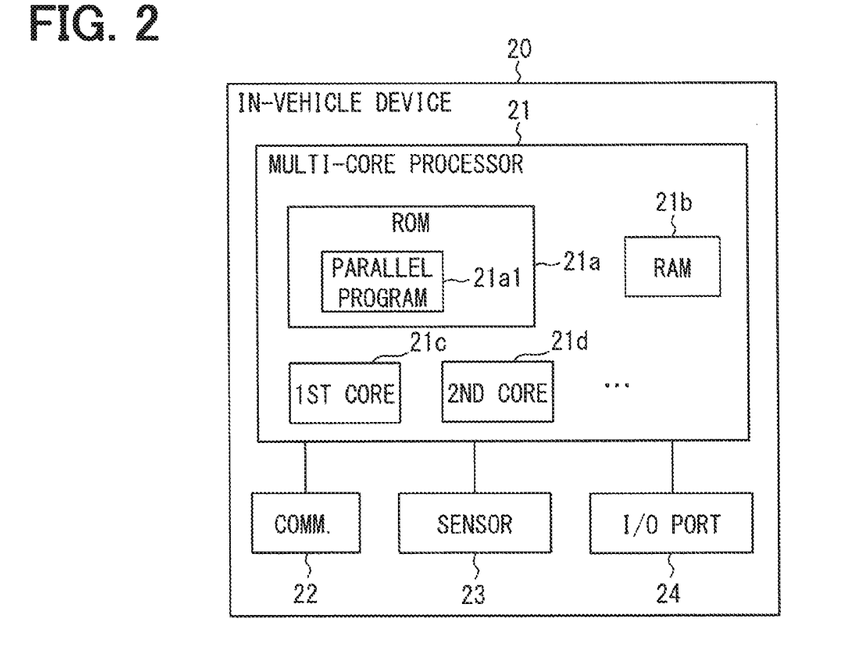
FIG. 2 is a block diagram of an in-vehicle device in one embodiment of the present disclosure.

The in-vehicle device 20 includes, as shown in FIG. 2, a multi-core processor 21, a communicator 22, a sensor 23, and an input/output port 24. The multi-core processor 21 includes a ROM 21a, a RAM 21b, a first core 21c, and a second core 21d.

The in-vehicle device 20 is applicable to an engine control device, a hybrid control device, and the like, which are disposed in a vehicle, for example.

The first core 21c and the second core 21d perform an engine control, a hybrid control, and the like by executing the parallel program 21a1. That is, the in-vehicle device 20 performs the engine control, the hybrid control, and the like by executing the MTs by using the first core 21c and the second core 21d to which the respective MTs are assigned.

Therefore, the in-vehicle device 20 includes the parallel program 21a1 in which the greater number of MTs are parallelized. Thus, the in-vehicle device 20 can perform each of those MTs optimally.

In addition, please refer to a RAM 420, a communicator 430, a sensor 450, and an input/output port 460 disclosed in a patent document JP 2015-1807 A, regarding the details of the RAM 21b, the communicator 22, the sensor 23, and the input/output port 24.

Although the present disclosure has been described in connection with preferred embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A parallelization method for generating a parallel program for a multi-core microcomputer, (i) based on a single program for a single-core microcomputer and (ii-a) by performing a data dependency analysis about data dependency relationships among unit processes of the single program respectively accessing a same data and (ii-b) by parallelizing parallelizable unit processes of the single program, the parallelization method comprising:
   an extraction procedure (i) obtaining invalidation information indicative of an ignorable relationship among a plurality of the data dependency relationships, and (ii) extracting from the invalidation information a write-write data dependency relationship showing an access to the same data as a synchronous-dependent relationship; and
   a generation procedure generating the parallel program for parallelizing a maximum number of the parallelizable unit processes, while preventing data abnormality by (a) ignoring other data dependency relationships other than the synchronous-dependent relationship, and (b) preventing simultaneous execution of the two unit processes having the synchronous-dependent relationship.

2. The parallelization method of claim 1, wherein
the extraction procedure (i) obtains contemporaneously mandatory information that shows, from among a plurality of data, a specific data that must abide by a control restriction on a timing of write and read, and (ii) extracts, from among the data dependency relationships shown by the invalidation information, a data dependency relationship including the write and read of the specific data that is shown by the contemporaneously mandatory information, the extracted data dependency relationship extracted as the synchronous-dependent relationship, and
the generation procedure (iii) ignores, from among the data dependency relationships shown by the invalidation information, the data dependency relationship that is not extracted by the extraction procedure, and (iv) generates the parallel program that achieves the maximum number of parallelization of the unit processes while (a) preventing simultaneous write to the same data by the two unit processes having the synchronous-dependent relationship and (b) maintaining the control restriction on the timing.

3. The parallelization method of claim 1, wherein
the generation procedure generates the parallel program by either maintaining or reversing a processing order of the two unit processes relative to the processing order of the two unit processes in the single program.

4. The parallelization method of claim 1, wherein
the extraction procedure exhaustively generates, for all of the extracted synchronous-dependent relationships, data dependency patterns by either maintaining or reversing a processing order of the two unit processes relative to the processing order of the two unit processes in the single program.

5. The parallelization method of claim 4 further comprising, in the generation procedure:
   a calculation procedure calculating a degree of parallelization for each of a plurality of scheduling results based on a scheduling of each of the generated data dependency patterns; and
   a determination procedure generating the parallel program with the number of parallelized unit processes maximized by adopting a scheduling result that has a maximum degree of parallelization calculated by the calculation procedure.

6. The parallelization method of claim 1, wherein
the plurality of unit processes of the single program are divisible in terms of dividing into a plurality of function groups, and
the invalidation information shows, as the ignorable relationship, the data dependency relationship among the unit processes that are divided into respectively different function groups.

7. A parallelization tool comprising:
a processor and a memory, the processor executes instructions in the memory to
   generate a parallel program for a multi-core microcomputer, (i) based on a single program for a single-core microcomputer and (ii-a) by performing a data dependency analysis about data dependency relationships among unit processes of the single program respectively accessing a same data and (ii-b) by parallelizing parallelizable unit processes of the single program;
   (i) obtain invalidation information indicative of an ignorable relationship among a plurality of the data dependency relationships and (ii) extract from the invalidation information a write-write data dependency relationship showing an access to the same data as a synchronous-dependent relationship; and
   generate the parallel program for parallelizing a maximum number of the parallelizable unit processes while preventing data abnormality by (i) ignoring other data dependency relationships other than the synchronous-dependent relationship and (ii) preventing simultaneous execution of the two unit processes having the synchronous-dependent relationship.

8. The parallelization tool of claim 7, wherein the processor is further configured to
   (i) obtain contemporaneously mandatory information that shows, from among a plurality of data, a specific data that must abide by a control restriction on a timing of write and read, and (ii) extract, from among the data dependency relationships shown by the invalidation information, a data dependency relationship including the write and read of the specific data that is shown by the contemporaneously mandatory information, the extracted data dependency relationship extracted as the synchronous-dependent relationship, and
   (iii) ignore, from among the data dependency relationships shown by the invalidation information, the data dependency relationship that is not extracted, and (iv) generate the parallel program that achieves the maximum number of parallelization of the unit processes while (a) preventing simultaneous write to the same data by the two unit processes having the synchronous-dependent relationship and (b) maintaining the control restriction on the timing.

9. The parallelization tool of claim 7, wherein the processor is further configured to
   generate the parallel program by either maintaining or reversing a processing order of the two unit processes relative to the processing order of the two unit processes in the single program.

10. The parallelization tool of claim 7, wherein the processor is further configured to exhaustively generate, for all of the extracted synchronous-dependent relationships, data dependency patterns by either maintaining or reversing a processing order of the two unit processes relative to the processing order of the two unit processes in the single program.

11. The parallelization tool of claim 10, wherein the processor is further configured to
calculate a degree of parallelization for each of a plurality of scheduling results based on a scheduling of each of the generated data dependency patterns; and
generate the parallel program with the number of parallelized unit processes maximized by adopting a scheduling result that has a maximum degree of parallelization which is calculated.

12. The parallelization tool of claim 7, wherein the plurality of unit processes of the single program are divisible in terms of dividing into a plurality of function groups, and the invalidation information shows, as the ignorable relationship, the data dependency relationship among the unit processes that are divided into respectively different function groups.

13. An in-vehicle device comprising:
a multi-core microcomputer having a plurality of cores; and
a parallel program having, based on a plurality of unit processes of a single program for a single-core microcomputer, the plurality of unit processes parallelized for the multi-core microcomputer, wherein
the parallel program assigns the unit processes to the plurality of cores so that the parallelized unit processes are maximized in number based on (i) obtaining invalidation information indicative of an ignorable relationship among a plurality of the data dependency relationships and (ii) extracting from the invalidation information a write-write data dependency relationship showing an access to the same data as a synchronous-dependent relationship, and by (iii) ignoring other data dependency relationships other than the synchronous-dependent relationship, while preventing simultaneous write to the same data by the two unit processes having the synchronous-dependent relationship, and
each of the plurality of cores of the multi-core microcomputer executes the unit processes assigned to the each of the plurality of cores of the multi-core microprocessor.

\* \* \* \* \*